(No Model.)
P. WIBERG.
HOSE NOZZLE.
No. 501,125.        Patented July 11, 1893.
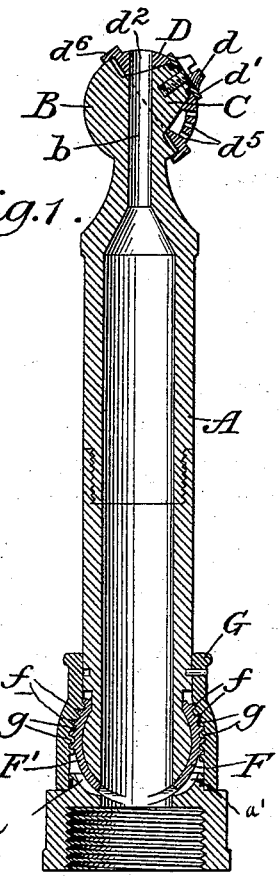
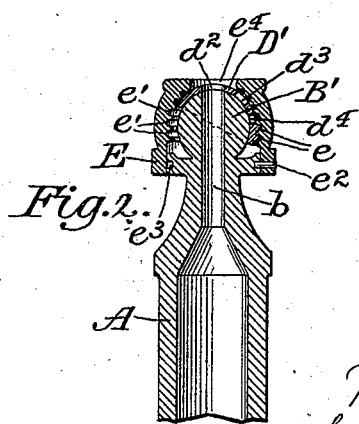
Attest:
A. N. Jesbera
A. Ondder
Inventor:
Peter Wiberg
by William B. Greeley
Att'y.

UNITED STATES PATENT OFFICE.

PETER WIBERG, OF NEW YORK, N. Y.

HOSE-NOZZLE.

SPECIFICATION forming part of Letters Patent No. 501,125, dated July 11, 1893.

Application filed July 21, 1892. Serial No. 440,739. (No model.)

*To all whom it may concern:*

Be it known that I, PETER WIBERG, of the city of New York, in the county and State of New York, have invented certain new and useful Improvements in Hose-Nozzles; and I do hereby declare that the following is a full and exact description thereof, reference being had to the accompanying drawings, and to the letters of reference marked thereon, making a part of this specification.

The object of my invention is to produce an improved hose-nozzle which shall be simple in construction and free from any projecting thumb-pieces for stop-cocks and yet be capable of regulating the size and character of the stream and of shutting off and controlling the flow of water at will.

My invention consists in the construction described and claimed hereinafter.

In the drawings: Figure 1 is a longitudinal central section of my improved nozzle. Fig. 2 is a vertical central section showing a slightly different form.

The body A of the nozzle may be made in any usual or preferred form and is provided at its outer extremity with a head B' which is perforated, as at $b$, in line with the axis of the nozzle. The head of the nozzle is spherical, as shown at B', and has fitted thereon a spherical shell D' which is provided with a series of suitable holes $d^2$, $d^3$, $d^4$. The shell is formed exteriorly with screw-gear teeth $e$, $e$, which are engaged by interior screw-threads $e'$, $e'$, on a thimble E. The latter is secured to the end of the nozzle so as to rotate thereon without longitudinal movement, a pin $e^2$ in the thimble entering a groove $e^3$ formed about the end of the nozzle. The end of the thimble is open, as at $e^4$. The rotation of the thimble moves the shell D', through the screw gearing, to bring one or another of the holes in the shell into line with the perforation $b$.

On account of the tendency to leakage which might exist if the shell D were depended upon to shut off the flow of water, especially when the pressure is great, I provide a shut-off at the other end of the nozzle, as shown in Fig. 1. The body of the nozzle is slotted laterally as at $a$, $a$, and is formed exteriorly to constitute a bearing for two opposing shells F and F', which are adapted to meet at the middle line and shut off the flow of water entirely, or to modify it as desired. These shells are provided exteriorly with screw-gear teeth $f$, $f$, which are engaged by the interior threads $g$, $g$, of a sleeve G which is adapted to rotate without longitudinal movement on the body of the nozzle.

I claim as my invention—

1. The combination with the body of a hose nozzle having a spherical head and perforated axially, of a shell fitted on said head and having a series of holes and exterior screw-threads, and a thimble rotatable on the end of said nozzle without longitudinal movement and having interior screw-threads to engage the screw-threads on said shell, substantially as shown and described.

2. The combination of the body of a hose-nozzle slotted laterally and shaped to form bearings, opposing shells F and F' adapted to move in said slots and on said bearings and formed with exterior teeth $ff$, and a sleeve G adapted to rotate on said nozzle and interiorly threaded to engage the teeth on said shells, substantially as shown and described.

In testimony whereof I have signed my name to this specification in the presence of two subscribing witnesses.

PETER WIBERG.

Witnesses:
   A. N. JESBERA,
   A. WIDDER.